United States Patent
Vanhooydonck

(12) 
(10) Patent No.: US 6,905,193 B2
(45) Date of Patent: Jun. 14, 2005

(54) METHOD AND APPARATUS FOR PRINTING GREY LEVELS WITH CURABLE INKS

(75) Inventor: Rudi Vanhooydonck, Zwijndrecht (BE)

(73) Assignee: Agfa Gevaert, Mortsel (BE)

(*) Notice: Subject to any disclaimer, the term of this patent is extended or adjusted under 35 U.S.C. 154(b) by 0 days.

(21) Appl. No.: 10/393,314

(22) Filed: Mar. 20, 2003

(65) Prior Publication Data

US 2003/0184633 A1 Oct. 2, 2003

Related U.S. Application Data

(60) Provisional application No. 60/371,547, filed on Apr. 10, 2002.

(30) Foreign Application Priority Data

Apr. 2, 2002 (EP) .............................. 02100329

(51) Int. Cl.[7] .............................. B41J 2/145
(52) U.S. Cl. .................. 347/41; 347/100; 347/102
(58) Field of Search ............................ 347/41, 15, 43, 347/100, 102, 502

(56) References Cited

U.S. PATENT DOCUMENTS 4,547,786 A  10/1985  Logan et al.

FOREIGN PATENT DOCUMENTS

| EP | 02 10 0329 | 9/2002 |
|----|------------|--------|
| WO | WO 00/30856 | 6/2000 |
| WO | WO 01/17780 A1 | 3/2001 |

*Primary Examiner*—Lamson Nguyen
(74) *Attorney, Agent, or Firm*—John A. Merecki

(57) ABSTRACT

A method and apparatus for dot matrix printing of an image on a printing medium using radiation curable compositions is described. The image is printed using the radiation curable composition as at least one set of mutually interstitially printed sub-images, each sub-image comprising a set of dots, a dot consisting of a number of droplets applied on top of each other, each droplet being formed from one of a plurality of radiation curable compositions, the droplets mixing on the printing medium thus forming the dot with a specific grey level. Before printing a next sub-image from the set of sub-images, the dots of the previously interstitially printed sub-image are actively rendering non-migratory by exposing them to radiation.

14 Claims, 5 Drawing Sheets

METHOD AND APPARATUS FOR PRINTING GREY LEVELS WITH CURABLE INKS

This application claims the benefit of Provisional Application No. 60/371,547, filed Apr. 10, 2002.

FIELD OF THE INVENTION

The present invention relates to ink jet printing, and more particularly to printed media, a method of printing and an apparatus for providing images having grey levels of varying intensity, especially for printing on transparencies used to produce high quality medical images such as X-ray, ultrasound, nuclear medicine, magnetic resonance, computed tomography, positron emission tomography, and angiography. With grey levels is meant black/white and/or colour levels of varying intensity.

TECHNICAL BACKGROUND

In medical imaging, it is necessary to print images with a resolution of at least 300 dpi and have 256 distinguishable grey levels, in order to be able to see enough details in the medical image.

In general, three methods exist to achieve a grey level in an image: area modulated printing, density modulated printing or combined area and density modulated printing.

In area modulated printing, grey levels are achieved by printing on certain places of a printing medium, and not printing on others. Ink with an infinite density is used. Light falling in on the medium passes through areas where nothing is printed, and is absorbed completely by the ink on the printed areas. Different methods are possible to print an image in this way: using one pixel with different dot-sizes, using different pixels with one dot-size or using different pixels with different dot-sizes.

U.S. Pat. No. 6,102,513 describes a method and apparatus for printing an output image on a receiver medium in response to an input image file defined by a plurality of pixels. Each pixel obtains a pixel value. The apparatus includes a print head with a plurality of nozzles. Each of the nozzles is capable of ejecting a plurality of ink droplets therefrom. The centres of ink droplets of different volumes are placed at the centre of a pixel on the receiver. In this way, ink spots of different diameters or sizes are symmetrically placed within pixels on the receiver.

It is very difficult to use an area-modulated printing method to obtain 256 grey levels at 300 dpi for a transparent image, because the printed dots need to be very small (smaller than 10 μm) in order to come below the Kanamori curve, which is a curve taking into account the non-linearity of the sensitivity of the human eye. If an area with a first density lies within an area with a second density, and the density difference between both lies under the Kanamori curve, then the area with the first density is indistinguishable from the area with the second density. Furthermore, the dots have to be placed very accurately. If it is desired to have a density of 3 with an infinite density ink, an area of $\frac{1}{1000}$th of the pixel should not be covered (white area), as the relationship between density and transparency is given by $T=10^{-D}$, D being the density and T being the transparency. This means that the droplets have to be placed with an accuracy of $$\sqrt{\frac{1}{1000}}$$

of the resolution. This is 2.7 μm for 300 dpi. If the accuracy is less (the distance between two dots is more than 2.7 μm for a 300 dpi image), stripes will become visible.

A second method to obtain a grey image is density modulated printing, in which grey levels are achieved by printing dots of the same size, but with a different ink density. A different ink density is obtained by reducing the transparency of the ink for certain dots. Light passes more or less through the ink, depending on the density or the colour of the ink. Because it is impossible to have 256 heads each printing a different ink, the ink has to be mixed during printing. This can be done either before jetting, such as described e.g. in U.S. Pat. No. 5,606,351 or in U.S. Pat. No. 6,097,406, or after jetting or on the medium, as described in U.S. Pat. No. 5,889,538 and in U.S. Pat. No. 5,625,397.

In U.S. Pat. No. 5,889,538, ink drops of different colours are ejected towards a printing medium and merge with each other thus forming a dot of a desired colour. Each ink drop has an amount of ink in accordance with print data, and is ejected at a timing corresponding to the amount of ink in the drop. A controller is provided for causing the ink pressure chamber of the printing apparatus to eject ink drops therefrom in accordance with the print data. The method described has the disadvantage that the amount of ink ejected, and the timing of ejection must be very precisely controlled.

In U.S. Pat. No. 5,625,397, plural inks of the same dye, having different densities, are used in a dot-on-dot printing format for printing on a receiving medium. That way, a desired optical density level may be readily achieved.

It is a disadvantage of the above methods that only a limited number of grey levels can be obtained.

SUMMARY OF THE INVENTION

It is an object of the present invention to provide a plurality of grey levels, preferably at least 256, on printing media which do not absorb used printing materials, such as inks, to a great extent, such as for example transparencies.

It is an object of the present invention to provide a plurality of grey levels, preferably at least 256, the densities of which are equally spread over the total density range so as to meet the Kanamori curve, i.e. so as to provide a quantisation of the density values wherein increments between a first and a second density value corresponding with successive grey scale values correspond with or are less than the minimum perceptible density difference.

It is a further object of the present invention to provide a printer and a printing method capable of printing a plurality of grey levels, preferably at least 256, the densities of which are equally spread over the total density range so as to meet the Kanamori curve, i.e. so as to provide a quantisation of the density values wherein increments between a first and a second density value corresponding with successive grey scale values correspond with the minimum perceptible density difference.

The objects of the present invention are achieved by a method of dot matrix printing an image on a printing medium using radiation curable compositions, the method comprising the steps of:
1. printing the image using the radiation curable composition as at least one set of mutually interstitially printed sub-images, each sub-image comprising a set of dots, a dot consisting of a number of droplets applied on top of each other, each droplet being formed from one of a plurality of radiation curable compositions, the droplets mixing on the printing medium thus forming the dot with a specific grey level, and 2. before printing a next sub-image from the set of sub-images, actively rendering the dots of the previously interstitially printed sub-image non-migratory by exposing them to radiation.

The present invention also provides an apparatus for printing an image on a printing medium using radiation curable compositions, the apparatus comprising 3. a print head for printing the image as at least one set of mutually interstitially printed sub-images using the radiation curable composition, each sub-image comprising a set of dots, the print head including nozzles for applying a number of droplets on top of each other, each droplet being formed from one of a plurality of radiation curable compositions, the droplets mixing on the printing medium thus forming a dot with a specific grey level, and 4. radiation means for actively rendering the dots of an interstitially printed sub-image non-migratory.

The present invention also provides a computer program product for executing any of the methods of the present invention when executed on a computing device associated with a printing head. The present invention also includes a machine readable data storage device storing this computer program product.

The present invention also provides a printing medium comprising printed data, the printed data being represented by a plurality of pixels, each pixel comprising a plurality of printed dots having a structure, the structure being defined by: the dots in one pixel being applied on top of or adjacent to neighbouring dots in the pixel, each dot being formed from a mixture of a plurality of radiation curable compositions, the mixture being formed on the printing medium thus forming a pixel with a specific grey level, and one dot having been actively rendered non-migratory by exposing it to radiation before printing a neighbouring dot.

The present invention also provides a control unit for use with a print head for printing an image having dots, each dot comprising a plurality of droplets from at least two radiation curable compositions with different grey levels, the control unit comprising means for controlling the number of droplets of each radiation curable composition to be applied for forming one dot.

The present invention will now be described with reference to the following drawings.

BRIEF DESCRIPTION OF THE DRAWINGS

FIG. 4b shows an enlarged middle square of FIG. 4a.

DETAILED DESCRIPTION OF THE INVENTION

Figures 1, 2:
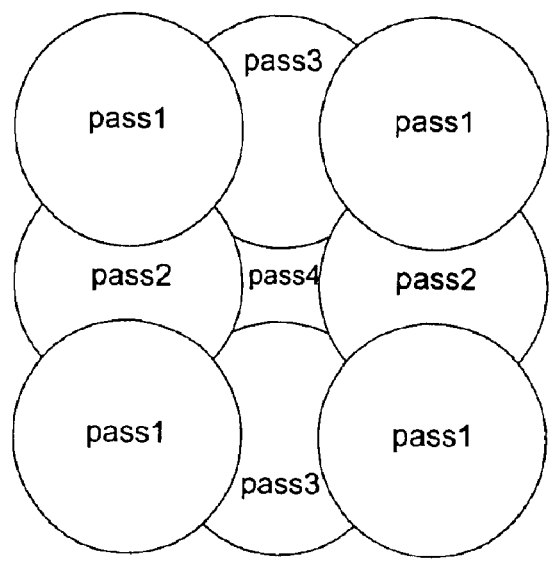
FIG. 1 shows a printing medium comprising a plurality of pixel locations, a dot consisting of a plurality of droplets according to an embodiment of the present invention being applied to one of the pixel locations.
FIG. 2 shows different dots being applied to different pixel locations during different passes according to an embodiment of the present invention, whereby dots applied during a later pass fill up space left between dots applied during (a) previous pass(es).

Although the present invention will be described with reference to certain embodiments and drawings the present invention is not limited thereto but only by the claims. The present invention will be described with reference mainly to ink-jet printing but the present invention is not limited thereto. The term "printing" as used in this invention should be construed broadly. It relates to forming markings whether by ink or other materials onto a printing substrate. Various printing methods which may be used with the present invention are described in the book "Principles of non-impact printing", J. L. Johnson, Palatino Press, Irvine, 1998, e.g. deflected ink jet printing, ion projection printing, field control printing, impulse ink jet printing, drop-on-demand ink jet printing, continuous ink jet printing. Non-contact printing methods are particularly preferred. However, the present invention is not limited thereto. Any form of printing including dots or droplets on a substrate is included within the scope of the present invention, e.g. piezoelectric printing heads may be used to print polymer materials as used and described by Plastic Logic (http://plasticlogic.com/) for the printing of thin film transistors. Accordingly, the term "printing medium" or "printing substrate" should also be given a wide meaning including not only paper, transparent sheets and textiles, but also flat plates or curved plates which may be included in or be part of a printing press, and bottles, cups, dishes, vases, glasses, sheets, figurines, tiles and the like from glass, plastic or ceramic, which are to be decorated. In addition the printing may be carried out at room temperature or at elevated temperature.

According to an embodiment of the present invention, an image is to be printed on a printing medium such as a transparency by means of a radiation curable composition. In general, radiation curable compositions contain a radiation curable component which may be monomers, oligomers, or low molecular weight homopolymers, copolymers, terpolymers, graft copolymers or block copolymers, so long as the component is cured (polymerised) by exposure to a form of radiation, e.g. electron beam, actinic or ultraviolet (UV) radiation. They may be printed in solution or by lowering their viscosity at an elevated temperatures. In a preferred composition, the radiation curable component is curable by UV radiation having a wavelength of 4 to 400 nm. In the case of actinic radiation, the radiation curable component is curable by actinic radiation having a wavelength of 4 to 600 nm. Radiation curable compositions as used with the present invention may include a variety of additives such as antoxidants, pigments, dyes and cross-linking agents.

The printing medium does not need to absorb the radiation curable composition to a great extent. In fact it is preferred if the droplets remain liquidly mobile on the surface of the printing medium sufficiently long that superimposed drops merge into each other. A plurality of radiation curable compositions are used. The plurality of different radiation curable compositions may be compositions of the same dye or pigment, but with different densities, and/or compositions of different dyes or pigments. UV curable inks suitable for printing processes especially ink jet printing are known in the art, e.g. U.S. Pat. No. 4,303,924, U.S. Pat. No. 4,258,367, U.S. Pat. No. 5,889,084, PCT patent application WO 99/02610, U.S. Pat. No. 6,312,123. Such inks are available commercially, e.g. a monomer curable ink supplied by Avecia, UK with the product name Pro-Jet Ultra Black Z2B. To provide different grey level inks this ink may be diluted with the ink vehicle, i.e. the compounds other than the colorant, which make up the ink.

As shown in FIG. 1, a printing medium 1 comprises a plurality of pixel positions 2, noted $p_{1,1}$ to $P_{n,m}$. On one pixel position 2, a print head 10 of a printing device 20 jets droplets 3 of different radiation curable compositions. All droplets 3 together, put on one pixel position 2, form a dot 4.

According to the present invention, each pixel position 2 of the image on the printing medium 1 receives a number of droplets, e.g. the same number of droplets 3 of the radiation curable compositions used. For example, 2 radiation curable compositions may be used, and each pixel position 2 may receive a combination of 15 droplets thereof, together forming one dot 4. This means that for each dot, 16 colour or density combinations are possible:

0 droplets of composition 1+15 droplets of composition 2
1 droplet of composition 1+14 droplets of composition 2
2 droplets of composition 1+13 droplets of composition 2
3 droplets of composition 1+12 droplets of composition 2
4 droplets of composition 1+11 droplets of composition 2
5 droplets of composition 1+10 droplets of composition 2
6 droplets of composition 1+9 droplets of composition 2
7 droplets of composition 1+8 droplets of composition 2
8 droplets of composition 1+7 droplets of composition 2
9 droplets of composition 1+6 droplets of composition 2
10 droplets of composition 1+5 droplets of composition 2
11 droplets of composition 1+4 droplets of composition 2
12 droplets of composition 1+3 droplets of composition 2
13 droplets of composition 1+2 droplets of composition 2
14 droplets of composition 1+1 droplet of composition 2
15 droplets of composition 1+0 droplets of composition 2

The total number of droplets 3 putdown for forming one dot 4, is exactly the same for each pixel position 2. All dots 4 formed by the different droplets 3 on one pixel position 2 have the same diameter (e.g. 42.3 μm for a 600 dpi image). When the different droplets 3 are put wet on wet, they immediately start mixing. Each of the number of desired densities or colours can be achieved by mixing the radiation curable compositions in different ratios, for example according to the list hereinabove.

According to embodiments of the present invention, an image will be printed as a set of mutually interstitially printed sub-images. The terms "mutually interstitial printing" or "interstitial mutually interspersed printing" used in the present patent application mean that an image to be printed is split up in a set of sub-images, each sub-image comprising printed parts and spaces, and wherein at least a part of the spaces in one printed sub-image form a location for the printed parts of another sub-image, and vice versa. According to the present invention, two dots to be printed on neighbouring pixel positions do not form part of one and the same sub-image. Therefore, an image is printed according to the present invention in at least four passes, wherein during each pass one sub-image is written. In what follows, an image printed in four passes is considered.

During a first pass, a first sub-image is written on the printing medium 1. Only droplets 3 forming dots 4 on the pixel locations 2 of, for example, the even columns and even rows are printed. These pixel locations 2 are noted with $p_{i,j}$, in FIG. 1, i and j being even. After this printing, each dot 4 is actively rendered non-migratory, e.g. by lighting with an UV lamp when UV curable ink is used as the radiation curable composition. By rendering a dot non-migratory is meant that it is made non-mixable with any dot applied as a neighbouring dot. This means that at least a dry skin is formed on the dot, while the internal part of the dot may stay liquid, so that if a neighbouring dot is applied, both dots do not bleed one into the other, and so that no colours mix. Instead of only forming a dry skin on the dot, the dot can be solidified, meaning that the whole of the dot is not liquid anymore, but there still being solvents left in the dot. Alternatively, the dot can be really dried, meaning that no solvents are left in the solidified dot anymore. It is clear that each of those different steps of rendering a dot non-migratory require a different curing time, which is dependent on the kind of radiation curable composition used, and on the number of droplets forming one dot. With actively rendering a dot non-migratory is meant that the dot is rendered non-migratory faster than a natural process of rendering it non-migratory. For example when UV curable inks are used, actively rendering a dot non-migratory means that it is illuminated by a UV lamp, and that it is not rendered non-migratory by leaving it subject to UV radiation in the environment.

After this step of rendering dots applied on the printing medium during the first pass non-migratory, during a second pass, a second sub-image is written on the printing medium 1: for example the dots 4 on the pixel locations 2 on the even rows in the odd columns can be printed and rendered non-migratory. These pixel locations 2 are noted with $p_{i,j}$, in FIG. 1, i being even and j being odd. If the first dots 4, printed on pixel locations $p_{i,j}$ with i and j even, were not rendered non-migratory before printing the dots 4 during the second pass, the dots 4 of neighbouring pixel locations 2 would mix, causing bleeding and the grey-level would not be correct.

In the same way, the dots 4 on the pixel locations 2 on the odd rows in the even columns can be printed and rendered non-migratory. These pixel locations 2 are noted with $p_{i,j}$, in FIG. 1, i being odd and j being even.

And during the fourth pass, the dots 4 on pixel locations 2 on the odd rows and odd columns can be printed and rendered non-migratory. These pixel locations 2 are noted with $p_{i,j}$, in FIG. 1, i and j being odd.

In the above, the step of applying dots on pixel locations 2 for printing a sub-image includes placing dots only at selected pixel locations where dots are desired for construction of a particular desired image. The filling-in step of printing a mutually interstitial sub-image includes placing marks only at other selected pixel locations where marks are desired for construction of a desired image.

Figure 3:
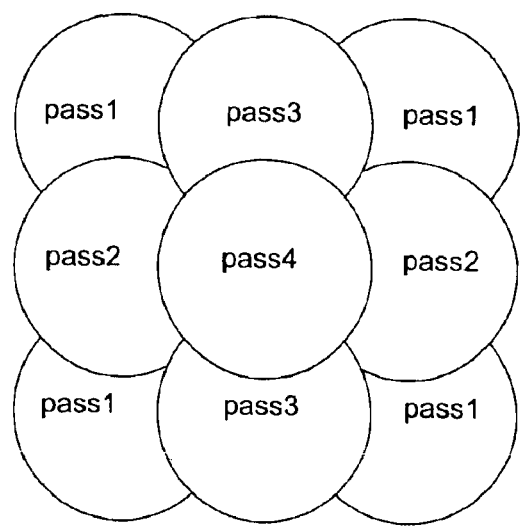
FIG. 3 shows different dots being applied to different pixel locations during different passes according to another embodiment of the present invention, whereby dots applied during a later pass print over dots applied during (a) previous pass(es).

For the example given, after four passes the areas covered with dots of the radiation curable composition will look as in FIG. 2 or as in FIG. 3, depending on the kind of composition used. Each circle or part of a circle in FIGS. 2 and 3 represent a dot 4 on a pixel location 2. The numbers inside those circles or parts of circles refer to the printing passes during which the dots 4 are printed on the printing medium 1.

If the used radiation curable compositions are thick, then after rendering the dots 4 printed during the first pass non-migratory, each dot has a certain 3-D structure, such as a small cylinder, which sticks out from the printing medium 1. During the next pass, radiation curable composition will flow in between those cylinders, and no real circular dots will be formed, but the dots will have a form filling up the space between two dots printed during pass one, as shown in FIG. 2 by the dots printed during pass 2. Also during passes 3 and 4, dots will fill up space left between neighbouring dots.

If the used radiation curable compositions are thinner, dots will overlap each other, and the result will be as shown in FIG. 3, with dots printed during a previous pass being partially covered by dots printed during subsequent passes.

According to the present invention, different inks can be used whereby dots can overlap. Out of the total number of possible combinations with a different density, it is possible to choose a certain number such as 256 combinations leading to grey levels that meet certain pre-set conditions, such as for example stability. By stability is meant the resistance of each grey scale value to printing errors, e.g. the resistance of the density to the errors in the accuracy of placing each dot which makes up a pixel or of the control of the size of each dot or density of dot.

The density D12 of an overlapping area between a first dot with density D1 and a second dot with density D2 can be calculated as follows:

$$D_{12} = D_1 + D_2 \quad \text{(eq. 1)}$$

or, in function of transparency, whereby the transparency T is given in function of the density D as $T = 10^{-D}$:

$$T_{12} = T_1 * T_2 \quad \text{(eq. 2)}$$

Figure 4A:
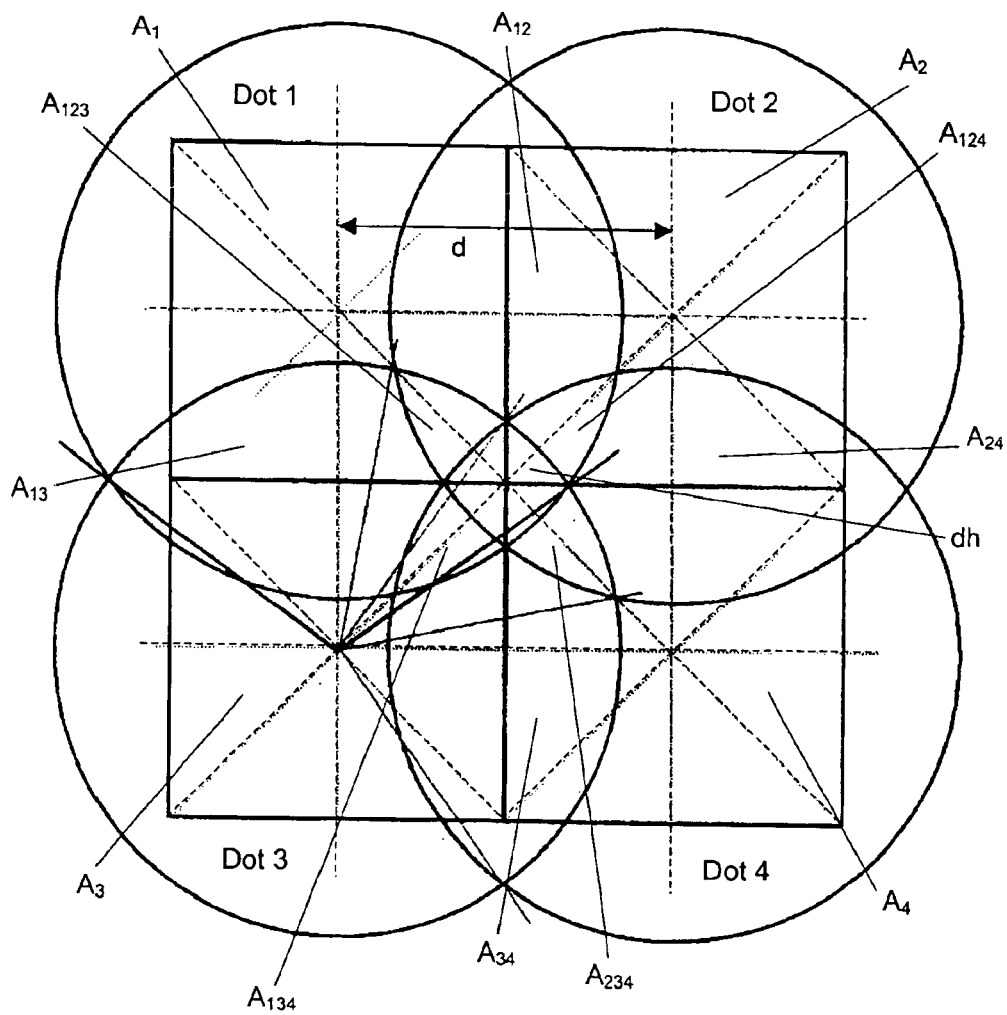
FIG. 4a illustrates a 2×2-matrix super-pixel with four overlapping dots of same dot sizes.

Calculating the resulting density of the super-pixel represented in FIG. 4a, whereby each dot may have a different density, may for example be done as described hereinafter. In this method, the area of each surface in FIG. 4b, which presents an enlarged version of the middle square in FIG. 4a, is calculated. Formulae for calculating each of the surfaces are not given hereinafter, as they are clear for a person skilled in the art.

Figure 4B:
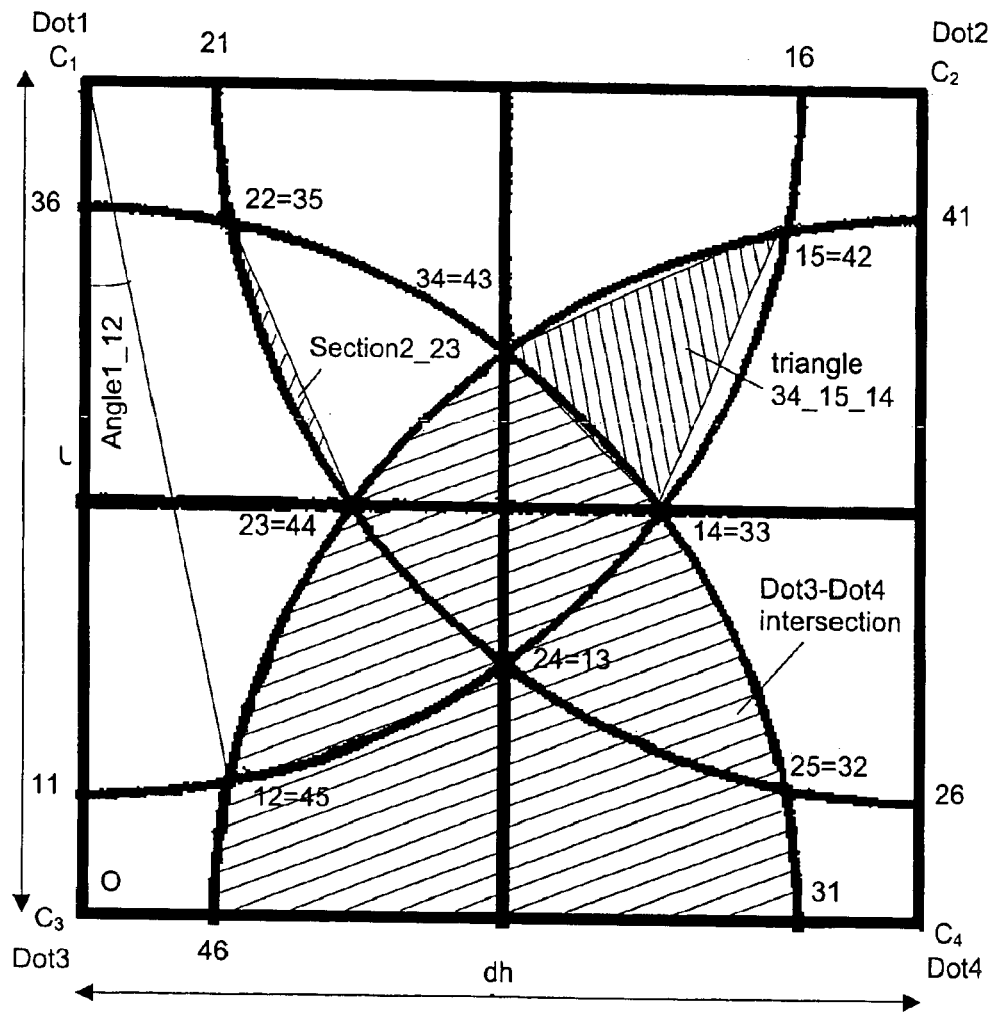

In the middle square of FIG. 4a, each point of intersection of one dot with another, and each point of intersection of a dot with the square, is numbered by means of a two-digit number ij, e.g. 11, 12, . . . , 16, 21, . . . , 26, 31, . . . , 36, 41, . . . , 46, as shown in the enlarged FIG. 4b, wherein the first digit i indicates to which dot the intersection point belongs, and wherein the second digit j indicates a serial number. For each set of two subsequent points of intersection of a dot i, the angle between both points ij1, ij2 with regard to the centre point c1 of the respective dot i is calculated, e.g. for dot 1, angle1_12 is calculated, which is the angle, seen from the centre point c1 of dot 1, between the points 11 and 12 (called in general anglei_j1j2.

An origin O is chosen for example in the centre point c3 of dot 3, as shown in FIG. 4b, and co-ordinates of each of the points of intersection are calculated, thereby using the calculated angles anglei_j1j2, the distance dh in horizontal direction between the centres of two neighbouring dots, and the distance dv in vertical direction between the centres of two neighbouring dots. In the example given in FIGS. 4a and 4b, dh and dv are equal, but in general they may be different.

For each dot i, using the calculated angles anglei_j1j2, the surfaces of the segments are calculated, such as e.g. sectioni-j1j2 represented in FIG. 4b as section 2_23.

Intersections between different dots dot i1, dot i2 are calculated, such as e.g. dot3-dot4 intersection shown in FIG. 4b, using the calculated angles anglei_j1j2 and the rays of the dots.

Areas of different triangles are calculated, such as triangle_34 _15 _14, which in combination with the respective calculated segments (to be added or subtracted) give the area of the respective surfaces.

Because the area of each part of the pixel covered with ink with a certain density is known (can be calculated), the total density of the pixel can be calculated as well, for example for the pixel in FIG. 4a:

$$D = -\log\left(\frac{\begin{array}{l}A_1 T_1 + A_2 T_2 + A_3 T_3 + A_4 T_4 + A_{12} T_{12} + A_{13} T_{13} + \\ A_{14} T_{14} + A_{23} T_{23} + A_{24} T_{24} + A_{34} T_{34} + A_{123} T_{123} + \\ A_{124} T_{124} + A_{134} T_{134} + A_{234} T_{234} + A_{1234} T_{1234}\end{array}}{\begin{array}{l}A_1 + A_2 + A_3 + A_4 + A_{12} + A_{13} + \\ A_{14} + A_{23} + A_{24} + A_{34} + A_{123} + A_{124} + \\ A_{134} + A_{234} + A_{1234} + A_{empty}\end{array}}\right) \quad \text{(eq. 3)}$$

Ai is the area of the pixel covered with a single ink with density Di (or thus the area with a transparency Ti); Aij is the area of the pixel covered with two different inks with densities Di and Dj (or thus the area with transparencies Ti and Tj); Aijk is the area of the pixel covered with three inks with densities Di, Dj and Dk (or thus the area with transparencies Ti, Tj and Tk); Aijkl is the area of the pixel covered with four inks with densities Di, Dj, Dk and Dl (or thus the area with transparencies Ti, Tj, Tk, and Tl); and Aempty is the area of the pixel that is not covered by ink at all. The total density is depending on the overlap of the individual pixels. A certain density is obtained by making the sum of all areas multiplied by the transparency, and by then making the average over the total area.

The surface of the pixel equals:

$$4d^2 = A_1 + A_2 + A_3 + A_4 + A_{12} + A_{13} + A_{14} + A_{23} + A_{24} + \quad \text{(eq. 4)}$$
$$A_{34} + A_{123} + A_{124} + A_{134} + A_{234} + A_{1234} + A_{empty}$$

Using eq. 3 and eq. 4, the density of a pixel can be calculated for every combination of dots within that pixel.

The results can be ordered, and the difference Δ between two succeeding values can be calculated. This difference Δ is, for example graphically, put in function of the density, and is then compared to the Kanamori curve. In this way, it is possible to determine the number of inks needed, as well as their density. By using the method of areas combined with different ink densities, best inks can be chosen to obtain a certain curve. This may be achieved by selecting ink densities and then using trial-and-error to obtain best results.

Now the number of achievable grey levels for one pixel location 2 will be calculated. If for example each dot 4 to be printed, consists of D droplets 3 (e.g. D=16), and I is the number of radiation curable compositions used which have a different density or colour (e.g. I=4), then the number of possible different densities or colours (grey levels GL) which can be achieved for a certain number I of radiation curable compositions and a certain number D of droplets, with a mixing system as described hereinabove, can be calculated as follows:

$$GL = \binom{I + D - 1}{D} = \frac{(I + D - 1)!}{D!(I - 1)!} \quad \text{(eq. 5)}$$

In this way, the minimum number of droplets necessary to get 256 grey-levels, can be calculated for a certain number of radiation curable compositions:

for I=2, D must be D=255,
for I=3, D must be D=22,
for I=4, D must be D=10.

Because in the example given, 16 droplets are combined in one dot (D=16), at least 4 radiation curable compositions are required. In this case, 969 combinations are possible.

For each of these 969 combinations, the density is calculated in the following way:

$$D = \frac{n_{I1}D_{I1} + n_{I2}D_{I2} + n_{I3}D_{I3} + n_{I4}D_{I4}}{(n_{I1} + n_{I2} + n_{I3} + n_{I4})}$$

wherein

D=density of the resulting dot

DIi=density of radiation curable composition Ii nIi=number of droplets used from radiation curable composition Ii The densities are calculated for each of the 969 possible combinations, and are ordered ascending. Then the contrast, which is the difference Δ between two successive densities, is calculated in each point, and put, for example graphically, in function of the density. This curve is compared with the Kanamori curve.

The Kanamori curve gives a relation between density differences and density, which density difference is distinguishable by the human eye at that density. For each density, a minimum density difference is necessary in order to be distinguishable. The Kanamori curve is the smooth curve shown in FIG. 5. It can be seen that, for densities in the lower part of the curve, lower density differences are more easily seen than for densities in the upper part of the curve. For example, for density 1, in order to be distinguishable, the density difference must be at least about 0.01, while for density 2, the density difference must be at least about 0.025. Therefore, for lower densities more grey levels are necessary than for higher densities.

By changing the densities of the different radiation curable compositions used, it is possible to find the best composition densities in respect to the Kanamori curve.

Figure 5:
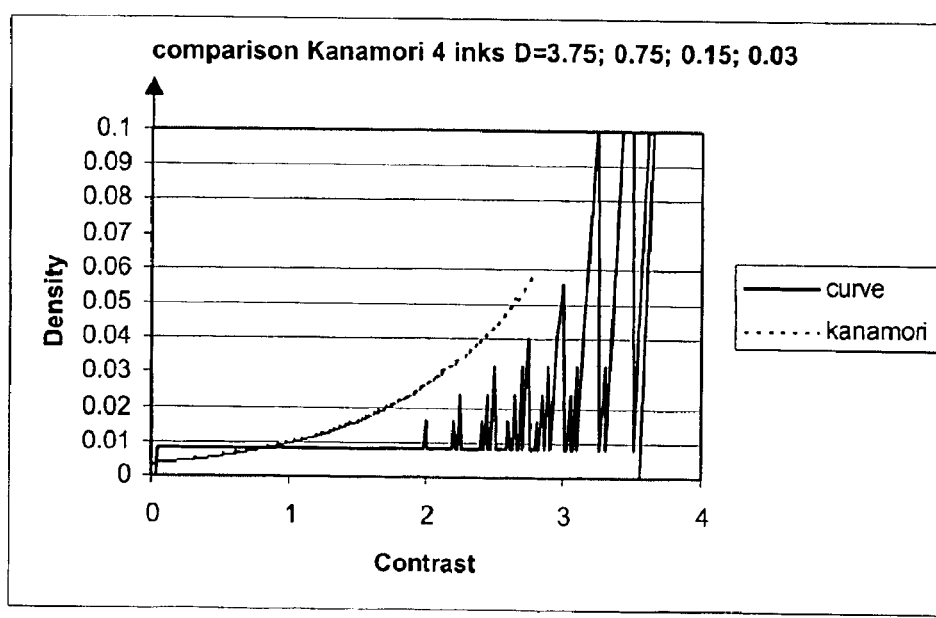
FIG. 5 shows a graph of contrast in function of densities of an example of dots consisting of droplets printed with four inks with different densities.

FIG. 5 shows a graph of densities of combinations of four inks, compared to the Kanamori curve. The density of ink I1=3.75, the density of ink I2=0.75, the density of ink I3=0.15 and the density of ink I4=0.03. The graph shows that it is possible to choose 256 values in such a way that the difference between two subsequent values is never so as to be above the Kanamori curve. This means that it is possible to make a continuous tone, so that no banding is seen in printed materials. If a graph would be obtained in which peaks peak out above the Kanamori curve, then no combination exists for which that density (of the peak) can be obtained.

In the above the operation of the radiation was made after each pass. However, the present invention is not limited thereto. A sub-image may include more than one pass. In this case all the passes of one sub-image are printed and then at least partly radiation cured before the print head returns to the beginning and continues with the next sub-image. However, this way of printing is less preferred as drops are left non-radiated for a long time.

Figure 6:
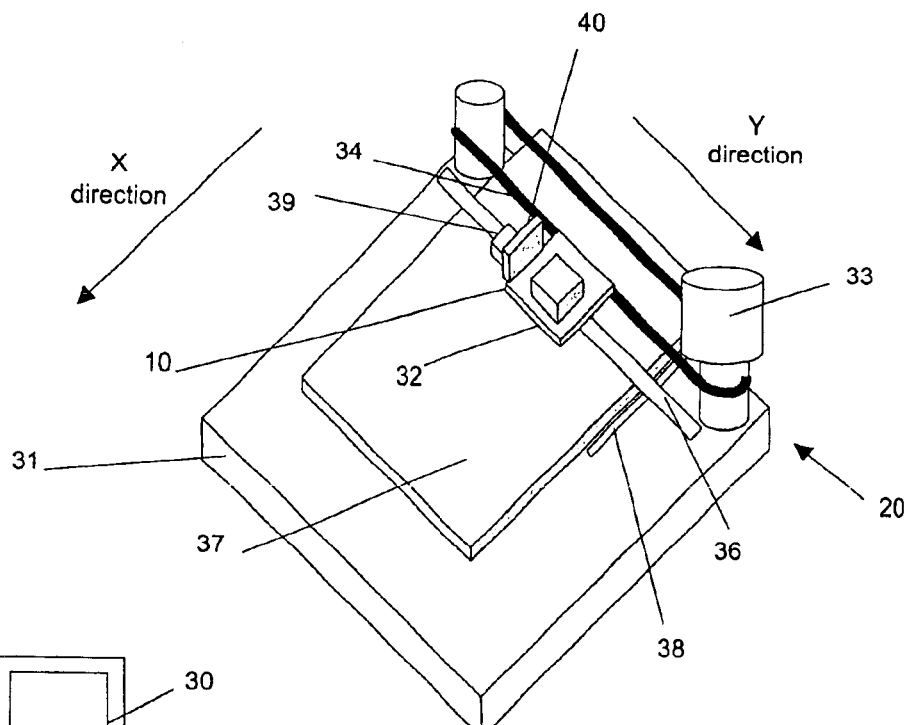
FIG. 6 is a highly schematic representation of an inkjet printer for use with the present invention.

FIG. 6 is a highly schematic general perspective view of an inkjet printer 20 which can be used with the present invention. The printer 20 includes a base 31, a carriage assembly 32, a step motor 33, a drive belt 34 driven by the step motor 33, and a guide rail assembly 36 for the carriage assembly 32. Mounted on the carriage assembly 32 is a print head 10 that has a plurality of nozzles. The print head 10 may also include one or more cartridges containing radiation curable compositions or any suitable supply system for supplying radiation curable compositions in order to obtain the grey levels as required by operation of the present invention. The cartridges containing radiation curable compositions may comprise a set of at least two different containers containing radiation curable compositions which have different grey scale levels when printed. Typically, in one form of printer, the print head 10 will be moved relative to the printing medium 37, e.g. a transparency, to produce a so-called raster line which extends in a first direction, e.g. across a page. The first direction is often called the "fast scan" direction. A raster line comprises a series of dots delivered onto the printing medium 37 by the nozzles of the print head 10. The printing medium 37 is moved, usually intermittently, over a support 38 by a feed mechanism (not shown) in a second direction perpendicular to the first direction. The second direction is often called the "slow scan" direction.

The carriage assembly 32 is moved along the guide rail assembly 36 by the action of the drive belt 34 driven by the step motor 33 in the fast scanning direction.

The printer 20 is provided with means 39 for actively rendering a dot non-migratory. These means 39 depend on the kind or radiation curable composition used for printing the image. If for example a UV ink is used, the means 39 may be a UV curing station. The means 39 may actively render the dots of a sub-image non-migratory either after a whole sub-image has been written, or during writing of part of the sub-image. In the second case, a means 39 may for example be connected to the carriage assembly 32 and therefore move with the print head 10 and render non-migratory dot which have just been printed. Alternatively the means 39 may move independently of the print head 10 (therefore requiring its own drive means) or be stationary across the width of the printing. In any case it might be useful to have a radiation screen 40 in between the head 10 and the means 39, so as not to solidify radiation curable composition present in the print head 10, which would block that head 10 and thus cause printing to stop, or so as not to render non-migratory droplets already applied for forming the next dot, but on top of which still other droplets need to be applied. The means 39 may include a radiation source such as a UV lamp and a focussing means to focus a radiation beam such as of UV light onto the surface of the printing medium which has been printed with the inks. Typically, the curing station 39 will follow just downstream of the print head 10.

Figure 7:
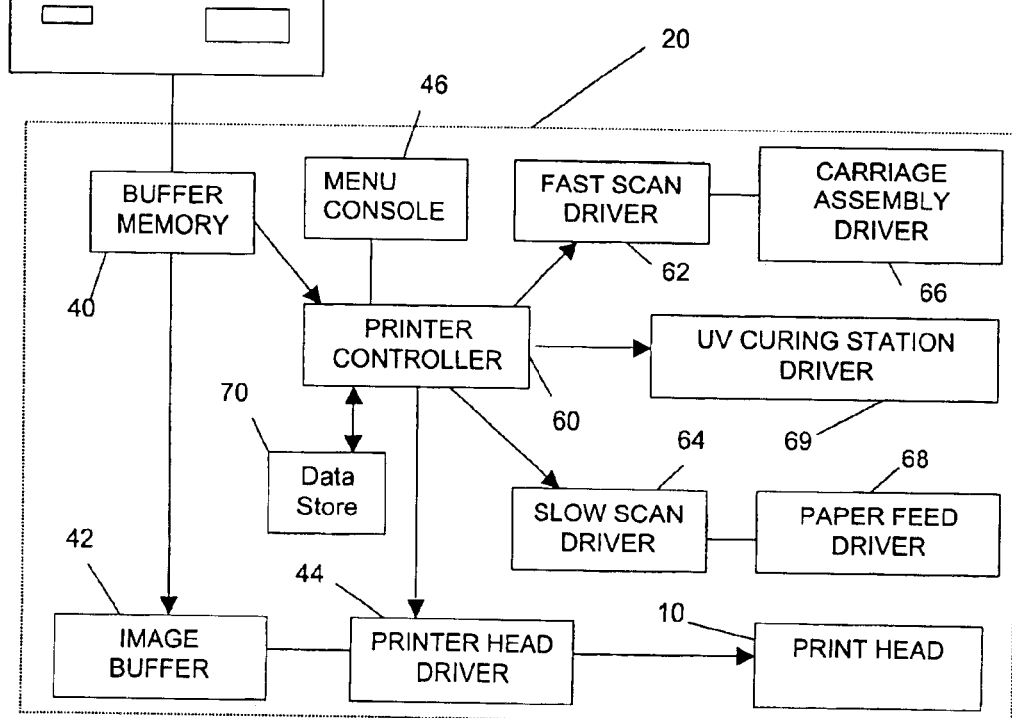
FIG. 7 is a schematic representation of a printer controller in accordance with an embodiment of the present invention.

FIG. 7 is a block diagram of the electronic control system of a printer 20, which is one example of a control system for use with a print head 10 in accordance with the present invention. The printer 20 includes a buffer memory 40 for receiving a print file in the form of signals from a host computer 30, an image buffer 42 for storing printing data, and a printer controller 60 that controls the overall operation of the printer 10. Connected to the printer controller 60 are a fast scan driver 62 for a carriage assembly drive motor 66, a slow scan driver 64 for a paper feed drive motor 68, a head driver 44 for the print head 10 and a curing station driver 69 for controlling the operation of the curing station 39. In addition there is a data store 70 for storing a look-up table or similar providing a concordance between a grey level to be printed and the number of droplets to be printed on one pixel location for each type of radiation curable composition to be used. Host computer 30 may be any suitable programmable computing device such as personal computer with a Pentium III microprocessor supplied by Intel Corp. USA, for instance, with memory and a graphical interface such as Windows 98 as supplied by Microsoft Corp. USA. The printer controller 60 may include a computing device, e.g. microprocessor, for instance it may be a microcontroller. In particular, it may include a programmable printer controller, for instance a programmable digital logic element such as a Programmable Array Logic (PAL), a Programmable Logic Array, a Programmable Gate Array, especially a Field Programmable Gate Array (FPGA). The use of an FPGA allows subsequent programming of the printer device, e.g. by downloading the required settings of the FPGA.

The parameters to be stored in the data store 70 may be set into the data store 70 from host computer 30, e.g. by printer driver software running on the host computer 30. For example, a printer driver of the host computer 30 determines the various parameters that define the printing operations and transfers these to the printer controller 60 for writing into the data store 70. Based on these parameters, the printer controller 60 reads the required information contained in the printing data stored in the buffer memory 40 and sends control signals to the drivers 62, 64, 69 and 44.

For instance, the printing data is broken down into the individual colour components to obtain image data in the form of a bit map for each colour component which is stored in the receive buffer memory 30. Each bit of the bit-map is associated with a grey level. In accordance with control signals from the printer controller 60, the head driver 44 reads out the colour component image data from the image buffer memory 52 to drive the array(s) of nozzles on the print head 10 to print the required droplets on the pixel locations and to drive the curing station 39 to cure the relevant deposited ink droplets.

As indicated above the printer controller 60 may be programmable, e.g. it may include a microprocessor or an FPGA. In accordance with embodiments of the present invention a printer in accordance with the present invention may be programmed to provide different grey level printing complexities. For example, the basic model of the printer may provide selection of a first number of grey levels and may be used with normal inks which are not radiation curable. An upgrade in the form of a program to download into the microprocessor or FPGA of the controller 60 may provide additional grey levels. Also the use of UV curable ink may be optionable and may be activated via the printer menu or from the host computer 30 by downloading the relevant program to drive the curing station driver 69 or by activating such a program which has been preinstalled but deactivated. Accordingly, the present invention includes a computer program product which provides the functionality of any of the methods according to the present invention when executed on a computing device. Furthermore, the present invention includes a data carrier such as a CD-ROM or a diskette which stores the computer product in a machine readable form and which executes at least one of the methods of the invention when executed on a computing device. The computing device may include one of a microprocessor and an FPGA.

The data store 70 may comprise any suitable device for storing digital data as known to the skilled person, e.g. a register or set of registers, a memory device such as RAM, EPROM, ROM or any solid state memory.

While the invention has been shown and described with reference to a preferred embodiment, it will be understood by those skilled in the art that various changes or modifications in form and detail may be made without departing from the scope of this invention. For instance, with reference to FIG. 7 the parameters for determining the data required for printing grey levels and/or the use of radiation curable inks is stored in data store 70. However, in accordance with the present invention the printing file to carry out the above mentioned printed embodiments may be prepared by the host computer 30 and the printer 20 simply prints in accordance with this file as a slave device of the host computer 30. Hence, the present invention includes that the printing schemes of the present invention are implemented in software on a host computer and printed on a printer which carries out the instructions from the host computer without amendment. Accordingly, the present invention includes a computer program product which provides the functionality of any of the methods according to the present invention when executed on a computing device which is associated with a printing head, that is the printing head and the programmable computing device may be included with the printer or the programmable device may be a computer or computer system, e.g. a Local Area Network connected to a printer. The printer may be a network printer. Further, the present invention includes a data carrier such as a CD-ROM or a diskette which stores the computer product in a machine readable form and which can execute at least one of the methods of the invention when the program stored on the data carrier is executed on a computing device. The computing device may include a personal computer or a work station.

What is claimed is:

1. A method of dot matrix printing an image on a printing medium using radiation curable compositions, the method comprising the steps of:

printing the image using the radiation curable composition as at least one set of mutually interstitially printed sub-images, each sub-image comprising a set of dots, a dot comprising a number of droplets applied on top of each other, each droplet being formed from one of a plurality of radiation curable compositions, the droplets mixing on the printing medium thus forming the dot with a specific grey level, and before printing a next sub-image from the set of sub-images, actively rendering the dots of the previously interstitially printed sub-image non-migratory by exposing them to radiation wherein an interstitially printed sub-image is formed during a single printing pass.

2. A method according to claim 1, wherein the step of actively rendering the dots non-migratory includes forming at least a dry skin on the dots.

3. A method according claim 1, wherein the step of actively rendering the dots non-migratory includes solidifying the dots.

4. A method according to claim 1, wherein the step of actively rendering the dots non-migratory includes drying the dots.

5. A method according to claim 1, wherein the radiation curable composition is a UV-curable ink.

6. A method according to claim 5, wherein a dot of UV curable ink is rendered non-migratory by illuminating it with light from a UV-lamp.

7. A method according to claim 1, wherein at least two radiation curable compositions with different grey levels are used.

8. A method according to claim 1, further comprising a step of selecting the number of droplets of each of a plurality of radiation curable compositions applied on top of each other, based on the Kanamori curve.

9. A computer program product for executing the method as claimed in claim 1 when executed on a computing device associated with a printing head.

10. An apparatus for printing an image on a printing medium using radiation curable compositions, the apparatus comprising a print head for printing the image as at least one set of mutually interstitially printed sub-images, each printed during a single pass, using the radiation curable composition, each sub-image comprising a set of dots, the print head including nozzles for applying a number of droplets on top of each other, each droplet being formed from one of a plurality of radiation curable compositions, the droplets mixing on the printing medium thus forming a dot with a specific grey level, and radiation means for actively rendering the dots of an interstitially printed sub-image non-migratory.

11. A machine readable data storage device storing the computer program product of claim 10.

12. A control unit for use with a print head for dot matrix printing an image on a printing medium using radiation curable compositions comprising the steps of:

printing the image using the radiation curable composition as at least one set of mutually interstitially printed sub-images, each sub-image, printed during a single pass and comprising a set of dots, a dot comprising a number of droplets applied on top of each other, each droplet being formed from one of a plurality of radiation curable compositions, the droplets mixing on the printing medium thus forming the dot with a specific grey level, and before printing a next sub-image from the set of sub-images, actively rendering the dots of the previously interstitially printed sub-image non-migratory by exposing them to radiation, the control unit comprising means for controlling the number of droplets of each radiation curable composition to be applied for forming one dot.

13. A control unit according to claim 12, wherein the control unit comprises means for controlling the print head to print a dot with at least two radiation curable compositions with different grey levels.

14. A control unit according to claim 12, further comprising means for controlling the selection of f he number of droplets based on the Kanamori curve.

* * * * *